(12) United States Patent
Nishimura et al.

(10) Patent No.: US 6,995,099 B1
(45) Date of Patent: Feb. 7, 2006

(54) COMPOSITE REINFORCING FIBER BASE MATERIAL, PREFORM AND PRODUCTION METHOD FOR FIBER REINFORCED PLASTIC

(75) Inventors: Akira Nishimura, Ehime (JP); Kiyoshi Homma, Shiga (JP); Ikuo Horibe, Ehime (JP); Takehiko Hirabara, Shiga (JP)

(73) Assignee: Toray Industries, Inc., Tokyo (JP)

(*) Notice: Subject to any disclaimer, the term of this patent is extended or adjusted under 35 U.S.C. 154(b) by 0 days.

(21) Appl. No.: 09/700,084

(22) PCT Filed: Feb. 22, 2000

(86) PCT No.: PCT/JP00/00989

§ 371 (c)(1),
(2), (4) Date: Nov. 9, 2000

(87) PCT Pub. No.: WO00/56539

PCT Pub. Date: Sep. 28, 2000

(30) Foreign Application Priority Data

Mar. 23, 1999 (JP) .................................. 11/077557
Apr. 14, 1999 (JP) .................................. 11/106846

(51) Int. Cl.
*B32B 9/00* (2006.01)
*B32B 5/02* (2006.01)
*B32B 3/10* (2006.01)

(52) U.S. Cl. ............................ 442/59; 442/60; 442/61; 442/179; 442/181; 442/361; 442/364; 442/401; 442/409; 428/373; 428/113

(58) Field of Classification Search .................. 442/59, 442/60, 61, 179, 181, 361, 364, 401, 409; 428/113, 373
See application file for complete search history.

(56) References Cited

U.S. PATENT DOCUMENTS

| | | | | |
|---|---|---|---|---|
| 4,282,283 A | * | 8/1981 | George et al. ............... | 428/228 |
| 4,906,506 A | * | 3/1990 | Nishimura et al. .......... | 428/113 |
| 4,931,358 A | | 6/1990 | Wahl et al. .................. | 442/242 |
| 4,983,451 A | | 1/1991 | Sugino et al. ............... | 442/338 |
| 5,082,720 A | * | 1/1992 | Hayes ......................... | 428/224 |
| 5,316,462 A | * | 5/1994 | Seemann .................... | 425/112 |
| 5,441,590 A | | 8/1995 | Ihm et al. ................... | 156/148 |
| 5,445,693 A | | 8/1995 | Vane ........................... | 156/93 |
| 5,800,749 A | * | 9/1998 | Lewit et al. ................ | 264/46.4 |

(Continued)

FOREIGN PATENT DOCUMENTS

DE 195 34 627 3/1997

(Continued)

OTHER PUBLICATIONS

Japanese Abstract Publication No. JP-A-11-034197, Publication Date Feb. 9, 1999.

(Continued)

*Primary Examiner*—Glenn Caldarola
*Assistant Examiner*—Alexis Wachtel
(74) *Attorney, Agent, or Firm*—Morrison & Foerster LLP

(57) ABSTRACT

The present invention is aimed at providing FRP formed by integrating a fiber reinforcing material and a non-woven fabric, and having excellent shaping ability, impact resistance after molding, and excellent reliability and low cost.

The aim of the present invention is achieved by a complex fiber reinforcing material including a sheet-shaped fiber reinforcing material composed of reinforcing fibers, and a non-woven fabric laminated on at least one side of the fiber reinforcing material, wherein the fibers constituting the non-woven fabric pass through the fiber reinforcing material to integrate the non-woven fabric with the fiber reinforcing material.

21 Claims, 7 Drawing Sheets

U.S. PATENT DOCUMENTS

| | | | | |
|---|---|---|---|---|
| 5,834,082 A | * | 11/1998 | Day | 428/56 |
| 5,883,023 A | | 3/1999 | Martine et al. | 442/331 |
| 5,888,916 A | * | 3/1999 | Tadokoro et al. | 442/334 |
| 5,908,689 A | | 6/1999 | Dana et al. | 428/219 |
| 2002/0123288 A1 | * | 9/2002 | Davies et al. | 442/327 |

FOREIGN PATENT DOCUMENTS

| | | |
|---|---|---|
| EP | 0 203 803 | 12/1986 |
| GB | 694460 | 7/1953 |
| GB | 1542153 | 3/1979 |
| JP | 3234522 | * 10/1991 |
| JP | 08134757 | * 5/1996 |
| WO | WO 99/21697 | 5/1999 |

OTHER PUBLICATIONS

Japanese Abstract Publication No. JP-A-10-317265, Publication Date Dec. 2, 1998.

* cited by examiner

COMPOSITE REINFORCING FIBER BASE MATERIAL, PREFORM AND PRODUCTION METHOD FOR FIBER REINFORCED PLASTIC

FIELD OF THE INVENTION

The present invention relates to a complex fiber reinforcing material exhibiting excellent properties as a complex fiber material, a preform comprising the complex material, and a method of producing a fiber reinforced plastic by using the preform.

BACKGROUND OF THE INVENTION

Fiber reinforced plastics (referred to as "FRP" hereinafter) composed of reinforcing fibers having high strength and high elasticity modulus, such as carbon fibers and the like, have excellent mechanical properties, and are thus versatile as structural materials for aircraft.

Although FRP has excellent mechanical properties in the fiber orientation direction, the mechanical properties in a direction deviated from the fiber axis rapidly deteriorate, i.e., the mechanical properties have great anisotropy. Therefore, in many cases in which FRP is used as a structural material for aircraft, a plurality of thin prepreg layers are laminated so that the fiber axes of adjacent layers deviate at about 30° to 60°, i.e., cross lamination is performed, to cause quasi-isotropy in the mechanical properties in the planar direction of FRP.

However, it is known that when an impact is applied to such a FRP plate in the thickness direction, the impact causes cracks between the respective layers of FRP because the layers have great anisotropy in mechanical properties, thereby causing delamination and significantly deteriorating the compression strength of the FRP plate receiving the impact.

As a countermeasure against this, for example, thermoplastic particles are adhered to a surface of prepreg to be arranged between the layers of the formed laminate so that the propagation energy of cracks due to impact force is absorbed by breakage of the particles, decreasing the area of delamination. This countermeasure significantly improves the residual compression strength of the FRP plate receiving the impact, which allows FRP to be used as a primary structural material for large civil aircraft.

However, this method increases the production cost of a FRP structural material due to the following causes:

A. The production cost of the thermoplastic particles having a uniform particle diameter is high because of the small particle diameter.

B. Since the particles are uniformly adhered to the resin surface of the prepreg, the working speed of the prepreg is decreased, or another new step is required for forming a resin film in which the particles are dispersed in a matrix resin in the B-stage state.

C. The particles enter the prepreg or the FRP layers after the resin of the prepreg is cured according to the production and molding conditions of the prepreg. This makes precisely arranging the predetermined particles between the layers difficult.

D. In autoclave molding using the prepreg, the use of the prepreg having tucks requires deaeration between the prepreg layers during lamination, and a plurality of thin prepreg layers must typically be laminated together in order to obtain a structural material having a predetermined thickness. This is a labor-intensive process.

Due to the declining cost of crude oil, aircraft makers are less inclined to purchase expensive light-weight materials. Accordingly, a way of reducing the production costs of FRP structural materials is desired.

For example, a resin transfer molding (RTM) method, in which the mold cavity is filled with a laminate of a fiber reinforcing material, and then a resin is injected has recently attracted attention as a low-cost molding method. However, this method cannot precisely arrange the thermoplastic particles between the layers of the laminate, and forming a high-toughness FRP having excellent impact resistance is difficult without an improvement in the resin. In addition, when the fiber reinforcing materials are simply laminated, the materials in the layers are deviated from each other making it difficult to handle and disturb the fiber orientation, and thus FRP having predetermined mechanical properties cannot be easily obtained.

DISCLOSURE OF INVENTION

The present invention provides a complex fiber reinforcing material having excellent shaping properties and impact resistance after molding. The present invention also provides a preform using the complex fiber reinforcing material and having uniform orientation of fibers, excellent handling property and impact resistance after molding. The present invention further provides a method of producing a fiber reinforced plastic capable of producing FRP having excellent impact resistance and high reliability at a low cost.

In order to achieve this, the present invention has the following construction.

A complex fiber reinforcing material comprises a sheet-formed fiber reinforcing material composed of reinforcing fibers, and a non-woven fabric composed of short fibers and laminated on at least one side of the fiber reinforcing material, wherein the short fibers constituting the non-woven fabric pass through the fiber reinforcing material to integrate the fiber reinforcing material with the non-woven fabric.

A fiber reinforcing material comprises a sheet-formed fiber reinforcing material composed of reinforcing fibers, and a non-woven fabric laminated on at least one side of the fiber reinforcing material, wherein the non-woven fabric is integrated with the fiber reinforcing material by a pressure sensitive adhesive.

A complex fiber reinforcing material comprises a sheet-formed fiber reinforcing material composed of reinforcing fibers, and a non-woven fabric laminated on at least one side of the fiber reinforcing material, wherein the fibers constituting the non-woven fabric contain 5 to 50% by weight of low-melting-point fibers, and the fiber reinforcing material is integrated with the non-woven fabric by heat bonding.

A preform comprises a laminate of a plurality of the complex fiber reinforcing materials in which the fiber reinforcing materials and non-woven fabrics are alternately laminated.

A method of producing a fiber reinforced plastic comprises covering the preform with a bag film, injecting a resin into the bag film in a vacuum state to impregnate the complex fiber reinforcing material with the resin, and curing the resin.

A method of producing a fiber reinforced plastic comprises setting the preform in a cavity formed by a he-mold and a she-mold, injecting a resin into the cavity in a vacuum state to impregnate the complex fiber reinforcing material with the resin, and curing the resin.

REFERENCE NUMERALS

Figure 1:
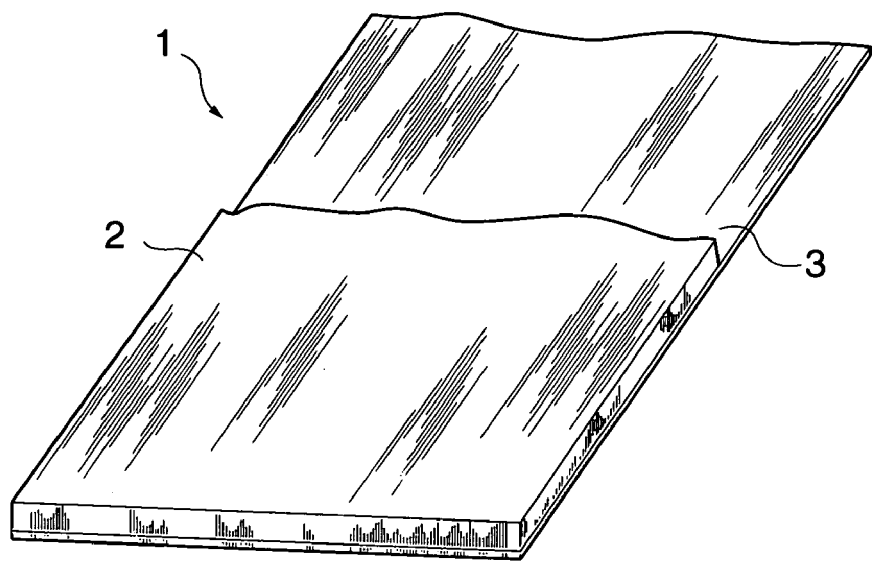
FIG. 1 is a partially cut-away perspective view showing the concept of a complex fiber reinforcing material according to the present invention.

1: complex fiber reinforcing material
2: fiber reinforcing material
3: non-woven fabric
4: reinforcing yarn
5: auxiliary weft yarn
6: auxiliary warp yarn
7: weft yarn
8: reinforcing yarn oriented in the direction at 0°
9: reinforcing yarn oriented in the direction at 90°
10: reinforcing yarn oriented in the direction at −45°
11: reinforcing yarn oriented in the direction at +45°
12: stitch yarn
13: non-woven fiber
14: mold
15: valve
16: peel ply
17: medium
18: suction port
19: edge breezer
20: bag film
22: discharge port
23: bar (tank A)
24: bar (tank B)
25: conjugate fiber
26: sheath of conjugate fiber
27: core of conjugate fiber

DESCRIPTION OF PREFERRED EMBODIMENTS

FIG. 1 is a partially cut-away perspective view showing the concept of a complex fiber reinforcing material 1 of the present invention. A fiber reinforcing material 2 (referred to as "the material" hereinafter) composed of reinforcing yarns, which are arranged in a sheet form, and a porous non-woven fabric 3 composed of short fibers are integrated by integration means (not shown in FIG. 1) such as fiber confounding, adhesion, or the like.

FIGS. 2 to 6 are partially cut-away perspective views showing various embodiments of the complex fiber reinforcing material 1 of the present invention.

Figure 2:
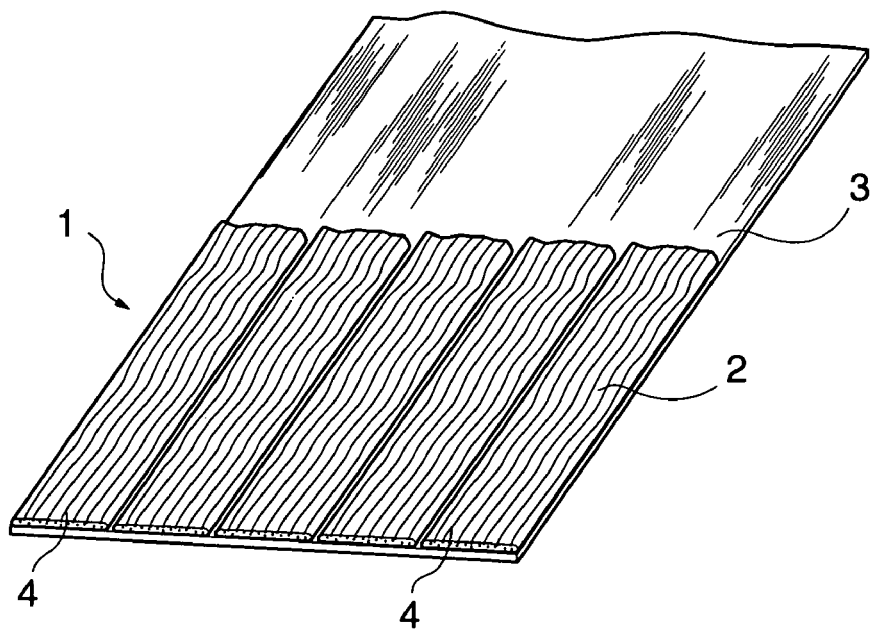
FIG. 2 is a perspective view showing a complex fiber reinforcing material comprising a uni-directional sheet material according to the present invention.

FIG. 2 shows an embodiment in which the non-woven fabric 3 is integrated with one side of a uni-directional sheet comprising reinforcing yarns 4 oriented in parallel with the length direction of the complex fiber reinforcing material 1.

Figure 3:
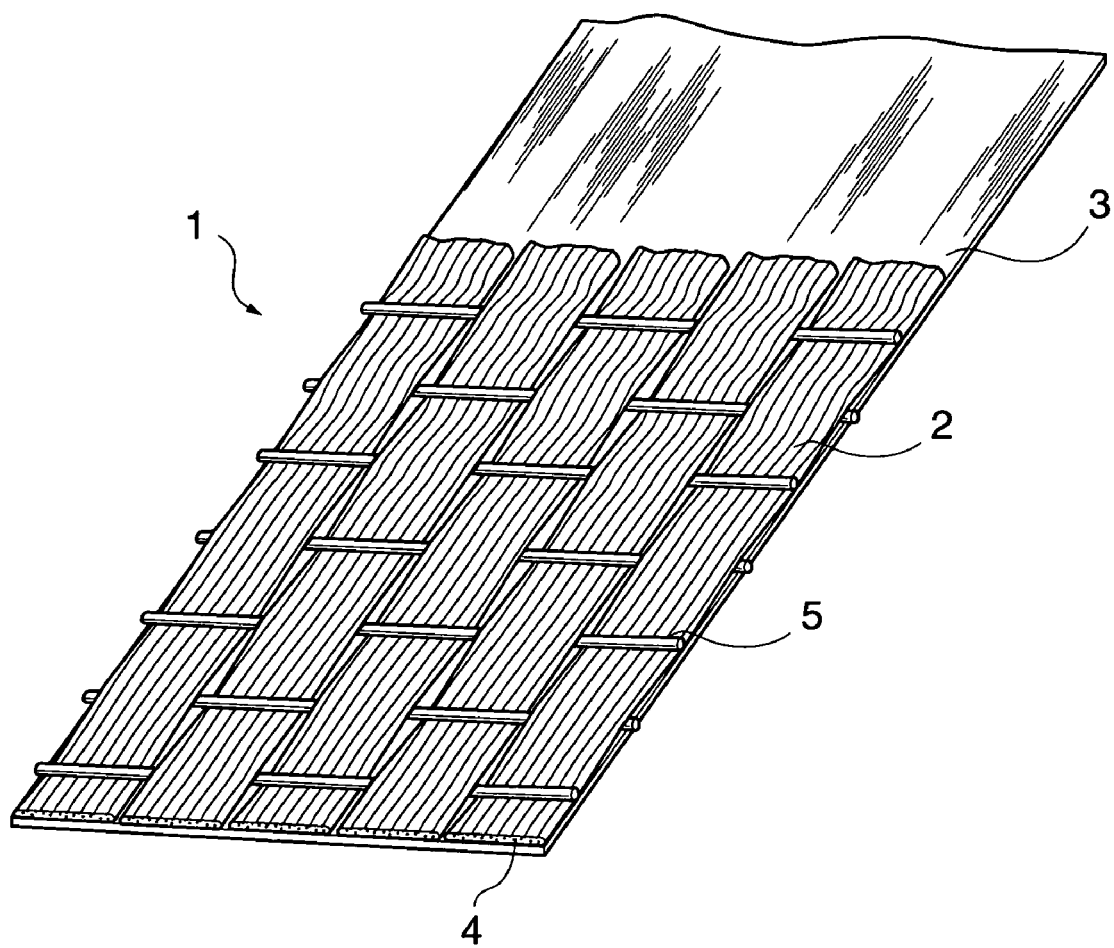
FIG. 3 is a perspective view showing a complex fiber reinforcing material comprising a uni-directional woven fabric material according to the present invention.

FIG. 3 shows, an embodiment in which the non-woven fabric 3 is integrated with one side of a uni-directional sheet comprising the reinforcing yarns 4 oriented in the length direction, i.e., the warp yarn direction, and auxiliary yarns 5 thinner than the reinforcing yarns, which are oriented in the weft yarn direction, so that the warp yarns 4 and the weft yarns 5 cross each other to form a woven structure.

Figure 4:
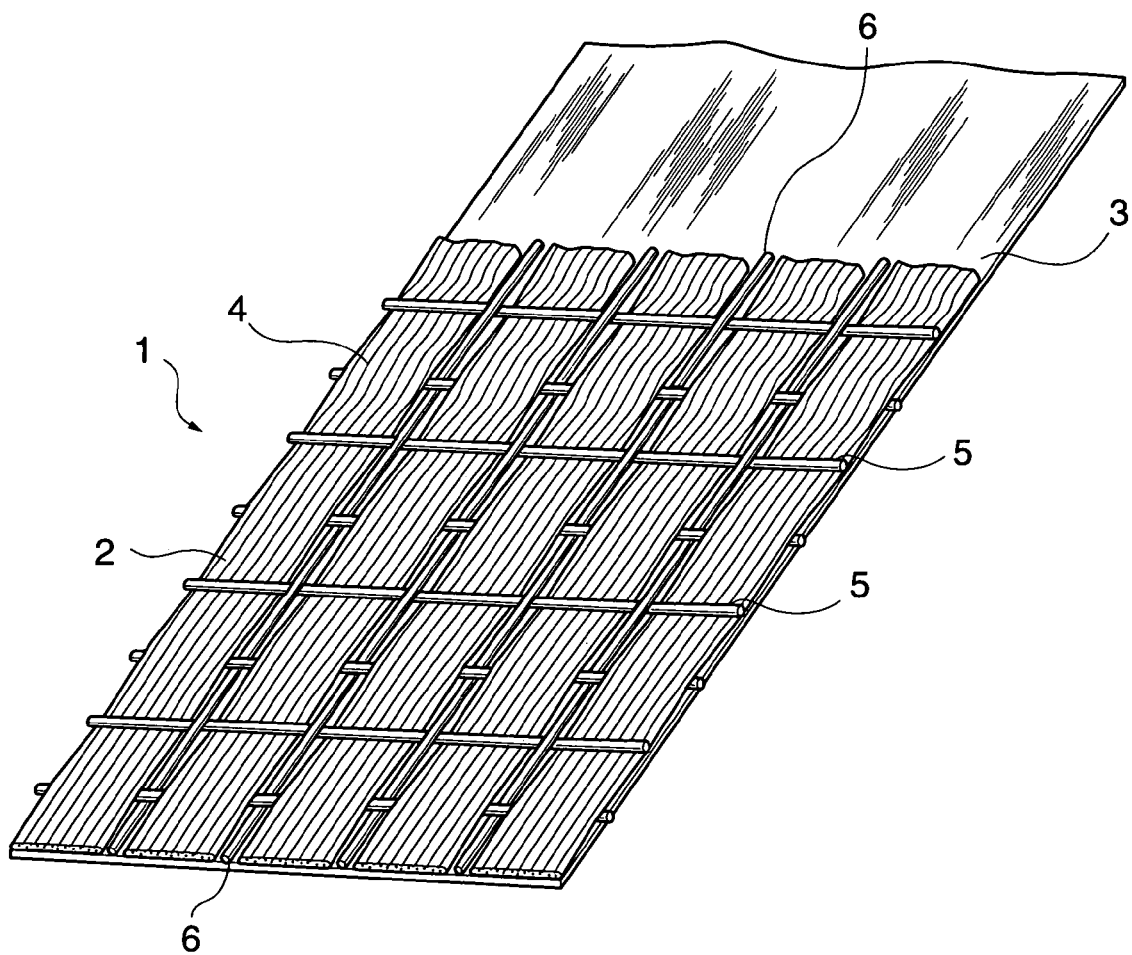
FIG. 4 is a perspective view showing a complex fiber reinforcing material comprising a uni-directional non-crimp woven fabric material according to the present invention.

FIG. 4 shows an embodiment in which the non-woven fabric 3 is integrated with one side of a so-called uni-directional non-crimp woven fabric comprising the reinforcing yarns 4 and auxiliary yarns 6 are oriented in the length direction of the material 2, i.e., in the warp yarn direction of the woven fabric, and the auxiliary weft yarns 5 cross the auxiliary warp yarns 6 so that the reinforcing yarns 4 are oriented straight without crossing the weft yarns 5.

In the uni-directional sheet or uni-direction non-crimp woven fabric comprising reinforcing fibers oriented in one direction, the reinforcing yarns are preferably oriented in parallel at intervals of about 0.1 to 5 mm to improve the fluidity of a resin in RTM molding or vacuum bag molding and increase the resin impregnation rate.

Figure 5:
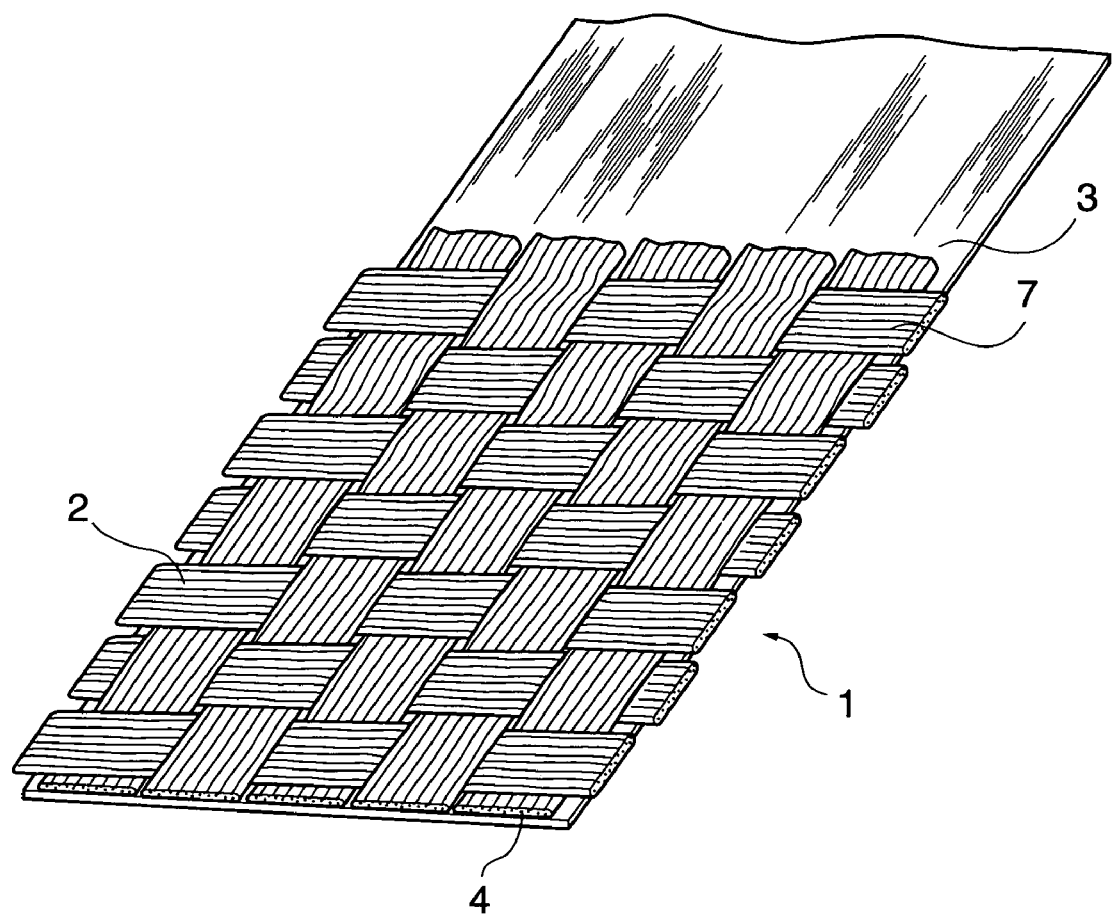
FIG. 5 is a perspective view showing a complex fiber reinforcing material comprising a bi-directional woven fabric material according to the present invention.

FIG. 5 shows an embodiment in which the non-woven fabric 3 is integrated with one side of a bi-directional woven fabric comprising the reinforcing yarns 4 oriented in the length direction of the material 2, i.e., the warp yarn direction, and reinforcing yarns 7 are oriented in the weft yarn direction so that the warp yarns 4 and the weft yarns 7 cross each other to form a woven structure.

In this case, the reinforcing yarns in at least one of the warp yarn direction and the weft yarn direction preferably have a flat sectional shape to decrease bending (crimp) when the warp yarns and the weft yarns cross each other, thereby improving the strength of a composite. The flat reinforcing yarns preferably have a width in the range of 4 to 30 mm, and a thickness in the range of 0.1 to 1.0 mm because a bi-directional woven fabric having less crimp and excellent weaving performance can be obtained.

Figure 6:
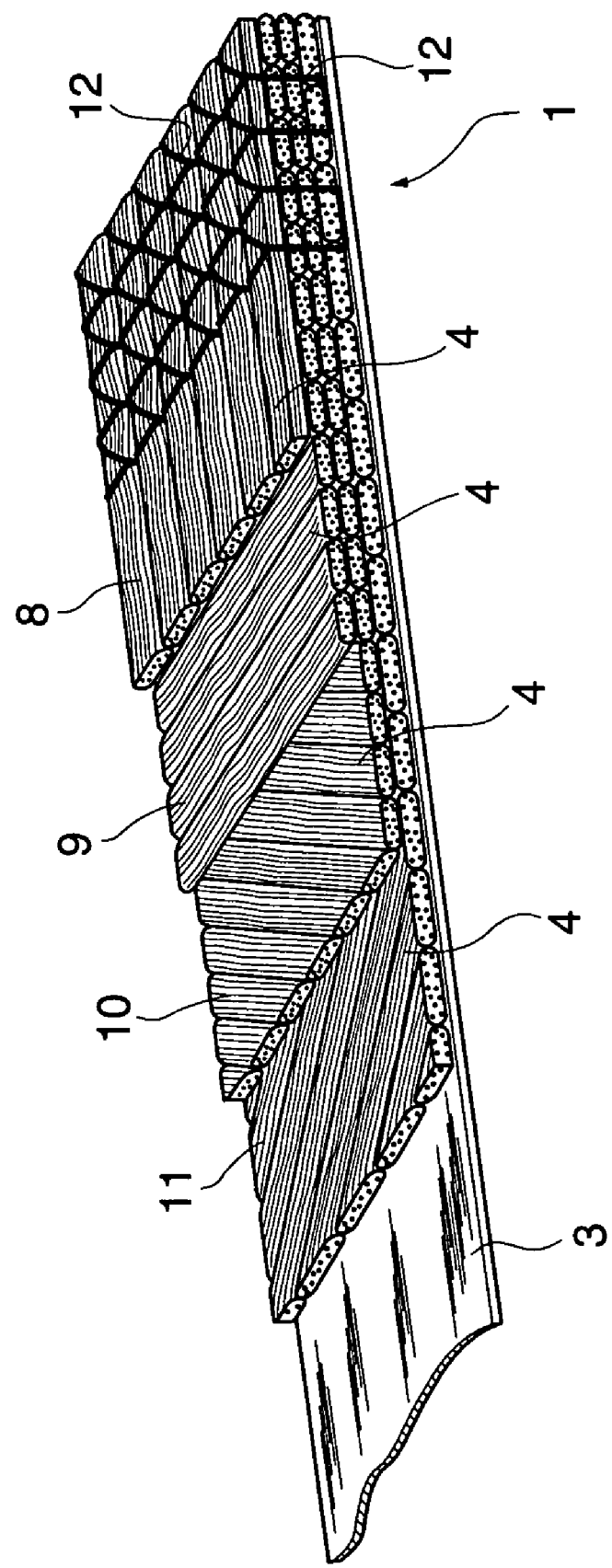
FIG. 6 is a perspective view showing a complex fiber reinforcing material comprising a stitch cloth material according to the present invention.

FIG. 6 shows an embodiment in which the non-woven fabric 3 is integrated with one side of a stitch cloth comprising a layer 8 comprising the reinforcing yarns 4 oriented in parallel with the length direction (0°) of the material 2, a layer 9 comprising the reinforcing yarns 4 oriented in the width direction (90°), and layers 10 and 11 each comprising the reinforcing yarns 4 oriented an oblique direction (±α°), these layers crossing each other and being stitched with a thin glass fiber yarn or a stitch yarn 12 composed of organic fibers, such as a polyaramid yarn, a polyester yarn, or the like. The orientation of the reinforcing yarns in the stitch cloth is not limited to the above, and orientation in two directions at ±α, orientation in three directions at 0 and ±α, or a combination with a matted material may be used.

Although each of FIGS. 2 to 6 shows the embodiment in which the non-woven fabric is integrated with one side of the material, the non-woven fabric is not necessarily integrated with one side, and non-woven fabrics may be integrated with both sides of the material.

As the reinforcing fibers used in the present invention, reinforcing fibers having high strength and high elasticity modulus, such as glass fibers, polyaramid fibers, carbon fibers, and the like, can be used. Particularly, the carbon fibers having a tensile modulus of 200 GPa or more, and a tensile strength of 4.5 Ga or more are preferably used because the fibers have not only high strength and high elasticity modulus but also excellent impact resistance. Although the size of the reinforcing yarns is not limited, a size in the range of 550 to 27,000 decitex is preferred, and a size in the range of 550 decitex to 23,000 decitex (500 denier to 20,000 denier) is more preferred.

With 550 decitex, the number of filaments per carbon fiber yarn is about 1000, while with 270,000 decitex, the number of filaments is about 400,000.

Although weight per unit area of the fiber reinforcing material is not limited, weight per unit area is preferably 100 to 2000 g/m$^2$. Weight per unit area of 150 to 1500 g/m$^2$, 100 to 1000 g/m$^2$, and 200 to 2000 g/m$^2$ are preferably used for a uni-directional woven fabric, a bi-directional woven fabric, and a stitch cloth, respectively.

The cover factor of the woven fabric which constitutes the fiber reinforcing material is preferably at least 95% or more. The cover factor means the ratio of the reinforcing fibers to the projected area of the woven fabric, and a higher value of the cover factor represents a close woven fabric having small spaces at the crossing positions between warp yarns and weft yarns. Therefore, as the value of the cover factor increases, the uniformity of a molded product of FRP increases, and particularly with a cover factor of 95% or more, a substantially uniform FRP molded product is preferably obtained.

As the auxiliary yarns used in the present invention, yarns with low heat shrinkability are preferably used. In molding by heating, thermal shrinkage of the auxiliary yarns due to heating decreases the width of the material to increase the density of the reinforcing yarns crossing the auxiliary yarns at right angles, thereby causing a change in the dispersion state of the reinforcing fibers. As a result, FRP having a predetermined fiber content cannot be obtained. In addition, thermal shrinkage of the auxiliary yarns parallel to the reinforcing yarns causes local bending of the reinforcing yarns to cause stress concentration in the bent portion in the produced FRP, thereby decreasing the tensile strength and tensile modulus. Therefore, the auxiliary yarns preferably have a dry heat shrinkability of 1.0% or less at 100° C., and more preferably 0.1% or less. As such auxiliary yarns, glass fibers, polyaramid fibers, and the like can be preferably used. As the auxiliary yarns, fine yarns having a size of 110 decitex to 890 decitex (100 denier to 800 denier) are preferably used.

Next, the non-woven fabric constituting the complex fiber reinforcing material of the present invention will be described. The non-woven fabric of the present invention is preferably a non-woven fabric composed of short fibers which are entangled by a mechanical bonding method comprising needle punching or punching with a fluid such as air, water, or the like, or bonding with a small amount of binder. The fibers which constitute the non-woven fabric may be oriented randomly or in parallel with the length direction of the non-woven fabric, or the non-woven fabric may comprise webs oriented in parallel with the length direction and cross-laminated.

Alternatively, a non-woven fabric comprising continuous fibers and obtained by a sheet making method, a spun bond method or a melt blow method can preferably be used as long as it has low weight per unit area and a stretchable form.

Such a non-woven fabric contains no adhesive or a small amount of adhesive for forming a cloth, and thus has no adverse effect on the properties of FRP. Also, since the fibers are bonded by entanglement, in fitting the complex fiber reinforcing material to a mold to shape it, the entanglement of the fibers is released, or the fibers slip to simply extend the fibers in all planar directions, improving the fitting property to the mold. Therefore, in forming a preform, the fitting property is not inhibited. On the other hand, a non-woven fabric strongly bonded by a thermoplastic polymer is undesirable because the fiber positions are fixed to lose the freedom of deformation.

In the present invention, weight per unit area of the non-woven fabric is preferably 5 to 30 g/m$^2$. With a non-woven fabric having weight per unit area lower than the lower limit of this range, the amount of the fibers of the non-woven fabric, which serve as interleaves between the layers of the FRP material is decreased making it difficult to obtain improved toughness. While with a non-woven fabric having weight per unit area over the upper limit of the above range, the ratio of the fibers, other than the reinforcing fibers, in FRP is increased undesirably deteriorating the mechanical properties such as strength and elasticity modulus.

In arranging a sheet-shaped material in a mold having a complicated shape without wrinkling, i.e., fitting the material therein, the fiber positions are partially deviated in a bent portion of the mold, or the crossing angle of the fibers change. Therefore, the complex fiber reinforcing material must have freedom for deformation. For example, in using paper or a film instead of the non-woven fabric, the complex fiber reinforcing material is wrinkled in fitting to the bent portion because of no freedom for deformation. In the wrinkled material, the reinforcing fibers are bent at the wrinkled portion to weaken the strength of the wrinkled portion of FRP, thereby undesirably causing the starting point of breakage.

The fitting property can be represented by the relation between the load and the amount of deformation when a complex fiber reinforcing material not impregnated with a resin is stretched in the direction in which the reinforcing fibers are not oriented. The tensile direction for examining the property is preferably an intermediate direction between the orientation directions of the reinforcing fibers. For example, with the reinforcing fibers oriented in the directions at 0° and 90°, the property may be examined in the direction at 45°, while with the reinforcing fibers oriented in the four directions at 0°, 45°, 90° and 135° (−45°), the property may be examined in the directions at 22.5°, 67.5°, 112.5° and 157.5°. Namely, the fitting property of the complex fiber reinforcing material is represented by the freedom for shear deformation, i.e., the shear deformation ability.

Examples of fibers which constitute the non-woven fabric include organic fibers such as polyaramide, nylon 6, nylon 66, vinylon, vinylidene, polyester, polyvinyl chloride, polyethylene, polypropylene, polyurethane, acryl, polyaramide, polyether ether ketone, polyether ketone, polyether imide, polyparaphenylene benzobisoxazole, polybenzobisoxazole, polygrilamide, vinylon, PBT, PVA, PBI, PPS, and the like; inorganic fibers such as carbon fibers, glass fibers, silicon carbide fibers, and the like. Of these fibers, organic fibers of nylon 6 and nylon 66 having high crystallinity are preferred because even when cracks occur between the layers of FRP due to an impact, the impact energy is absorbed by damage of the organic fibers to suppress the progress of the cracks, thereby obtaining the effect of significantly improving toughness by only a small amount of fibers. In addition, since such fibers are composed of general-purpose polymers, the non-woven fabric becomes inexpensive.

Description will be now made of the state in which the non-woven fabric and the material of the complex fiber reinforcing material of the present invention are integrated.

The fibers which constitute the non-woven fabric preferably pass through the reinforcing fiber layers, which form the material, to integrate the non-woven fabric with the material. This bonding state requires no adhesive for bonding, and thus causes no adverse effect on the properties of FRP. Also, the fibers which constitute the non-woven fabric pass through the reinforcing fiber layers to be combined therewith, and thus the drapability of the material is not inhibited by the non-woven fabric having the excellent fitting property. In order to exhibit the effects, the fibers preferably pass through the material with 1 to 1000 punches/cm$^2$, more preferably 2 to 500 punches/cm$^2$, most preferably 10 to 100 punches/cm$^2$.

The fibers which constitute the non-woven fabric can be passed through the reinforcing fiber layers by, for example, needle punching or mechanical bonding method such as punching with a fluid such as a water jet, an air jet, or the like. Particularly, air jet punching is preferably used because the reinforcing fibers are not damaged by punching, and post-processing such as drying after punching can easily be performed. Alternatively, a web in which fibers are not entangled may be placed on the material instead of the non-woven fabric so that the non-woven fabric is formed and integrated with the material at the same time by the mechanical bonding method.

Figure 7:
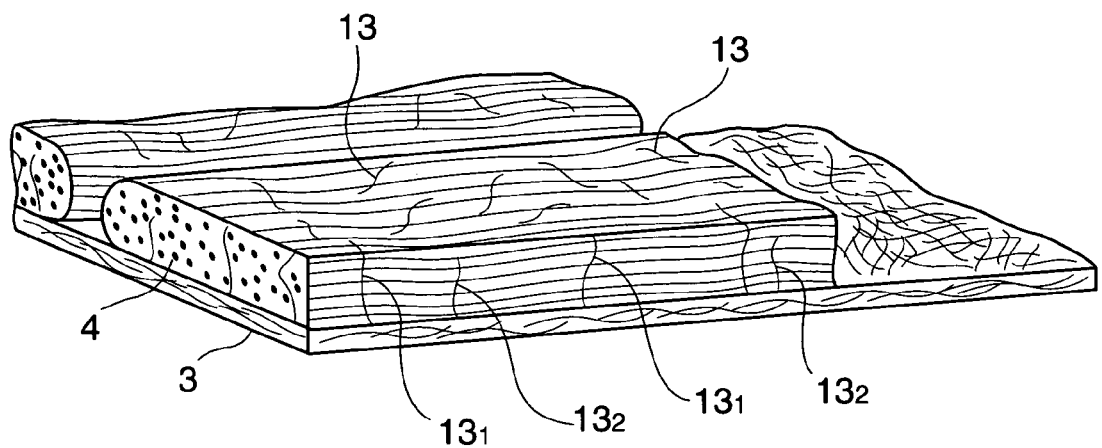
FIG. 7 is a drawing showing a model of a state in which a non-woven fabric is integrated with a material by passing fibers.

FIG. 7 is a drawing showing a model of the state in which the short fibers of the non-woven fabric 3 pass 4 through the reinforcing fiber layers 4 of the material to integrate the fibers with the material. The short fibers 13 which constitute the non-woven fabric 3 are entangled with each other in the plane of the non-woven fabric, and comprise the fibers $13_1$ completely passing through the reinforcing fiber layers of the material, and the fibers $13_2$ passing through the reinforcing layers of the material to intermediate positions thereof. The fibers completely passing through the reinforcing fiber layers may be reversed and again pass through the reinforcing fiber layers.

In integration between the material and the non-woven fabric, the degree of entanglement of the fibers need not be increased as long as the material and the non-woven fabric are not separated in cutting and handling the complex fiber reinforcing material in preparation for molding.

When the non-woven fabric is integrated with the material by the fibers which form the non-woven fabric and pass through the reinforcing fibers which form the material, the non-woven fabric preferably comprises the short fibers having a length of 20 to 120 mm. In order to increase the number of the fiber terminals to increase the number of the confounding positions with the reinforcing fibers by a small amount of fibers, the fiber length is more preferably 20 to 70 mm. Similarly, in order to increase the number of the fiber terminals to increase the number of the fibers passing through the reinforcing fiber layers by a small amount of fibers, the fiber diameter of the short fibers which form the non-woven fabric is preferably 0.005 to 0.03 mm.

In the present invention, the material and the non-woven fabric are also preferably integrated with each other by a pressure sensitive adhesive. Since strong integration using the pressure sensitive adhesive inhibits the drapability of the non-woven fabric, and deteriorates the drapability of the complex fiber reinforcing material, the amount of the pressure sensitive adhesive used is preferably about 1 to 10 g/m$^2$, more preferably 2 to 5 g/m$^2$.

As the pressure sensitive adhesive, bismaleimide, epoxy and PMMA type adhesives are preferred because the properties of FRP are not deteriorated. For example, the material and the non-woven fabric can be integrated by diluting any of these adhesives with an organic solvent or water, and adhering the diluted adhesive to the material or the non-woven fabric by spraying it.

In the present invention, also a small amount of low-melting-point fibers is preferably added to the fibers which constitute the non-woven fabric to integrate the material and the non-woven fabric by heat bonding. The fibers which constitute the non-woven fabric preferably contain a small amount of low-melting-point fibers because the complex fiber reinforcing material can be shaped along the mold, and another complex fiber reinforcing material can be laminated thereon while shaping it, followed by bonding by heating the laminate to a temperature higher than the melting point of the low-melting-point fibers, and pressurizing the laminate to form a preform. As the low-melting-point fibers, low-melting-point fibers comprising a low-melting-point thermoplastic polymer, or conjugate fibers comprising a low-melting-point polymer provided in a sheath can be used.

With the non-woven fabric having an excessively high content of low-melting-point fibers, the freedom of the complex fiber reinforcing material for deformation is lost, while with the non-woven fabric having an excessively low content of low-melting-point fibers, bonding for forming a preform is insufficient. Therefore, the content of the low-melting-point fibers is preferably 5 to 50% by weight. The content is more preferably 10 to 40% by weight, most preferably 20 to 30% by weight.

As the low-melting-point thermoplastic polymer, polymers having a melting point of about 60 to 160° C. which is lower than other fibers used for forming the non-woven fabric, such as nylon copolymer, modified polyester, vinylon, and the like, are preferably used.

In the conjugate fibers, the polymer of the core preferably has a melting point of 200 to 300° C.

Figure 10:
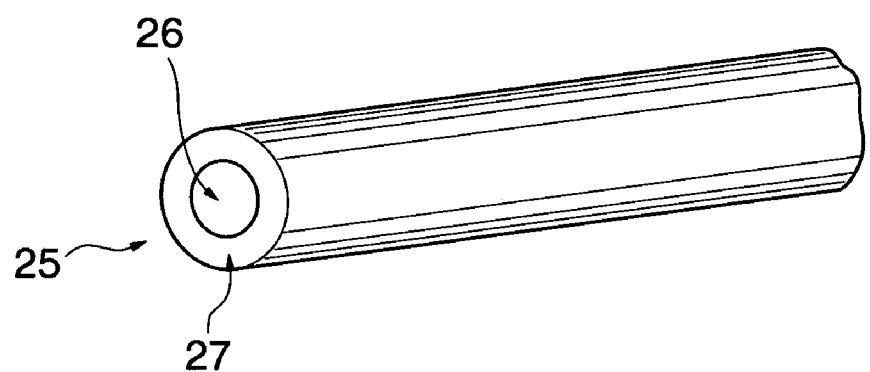
FIG. 10 is a perspective view of a conjugate fiber.

FIG. 10 is a perspective view of a conjugate fiber 25 comprising a thermoplastic polymer used for the non-woven fabric, in which the polymer of the sheath 27 has a lower melting point than the polymer of the core 26. Although the low-melting-point polymer which constitutes the sheath 27 of the conjugate fiber preferably has a melting point lower than the polymer which constitutes the core, polymers having a melting point of about 60 to 160° C., such as nylon copolymer, modified polyester, vinylon, and the like, are preferably used. Particularly, a combination of the sheath composed of nylon copolymer, and the core composed of nylon 6 or nylon 66 is preferred because the core and the sheath are the same type and thus sufficiently bonded together, thereby preventing the core and the sheath from being separated by the stress acting on FRP due to an impact or the like.

The difference between the melting points of the polymers of the core and the sheath is preferably 50° C. or more. This is because with a difference lower than the lower limit of this range, the difference between the melting points of the core polymer and the sheath polymer is small, and thus the polymer of the core is also melted in melting the polymer of the core. In addition, the molecular orientation of the core is disturbed to decrease the effect of improving the impact resistance by the polymer of the core.

In the conjugate fiber, the ratio of the core is preferably in the range of 30 to 70% of the sectional area of the fiber. With a core ratio of less than 30%, the amount of the polymer component absorbing impact energy is decreased to decrease the effect of improving the impact toughness of FRP. Furthermore, in order to absorb the predetermined impact energy, the amount of the fibers in the non-woven fabric must be increased to decrease the ratio of the reinforcing fibers in FRP, decreasing the mechanical properties of FRP. On the other hand, with a core ratio of over 70%, the amount of the low-melting-point polymer in the sheath is decreased to cause insufficient bonding to the material.

Of course, at least two integration methods may be selected from the methods of passing fibers, adding low-melting-point fibers, using the pressure sensitive adhesive, and others. In this case, even when each of the conditions does not exceed the upper limit of the preferred range, a combination of a plurality of methods causes excessive integrating effect to derive an undesirable effect, while even when each of the conditions does not reach the lower limit of the preferred range, a combination of a plurality of methods causes addition of the effects to achieve the sufficient integrating effect in some cases. In this case, it is useful to refer to the discrimination system below. Particularly, the discrimination system is useful for cases in which even when each of the conditions does not reach the lower limit of the preferred range, a combination of a plurality of methods causes addition of the effects to achieve the sufficient integrating effect.

$1 \leq \Sigma_i(M_i/M_{i1})$ and $\Sigma_i(M_i/M_{i2}) \leq 1$      preferred range $\Sigma_i(M_i/M_{i1}) < 1$ or $1 < \Sigma_i(M_i/M_{i2})$      undesirable range $\Sigma_i$: Calculation of the total of elements with subscript i $M_i$: Value subjected to integration means i $M_{i1}$: Lower limit of the preferred range of integration means i $M_{i2}$: Upper limit of the preferred range of integration means i The non-woven fabric of the present invention preferably has a porous state from the viewpoint of ensuring the impregnating property of the laminate of the complex fiber reinforcing material with the resin in the layer direction during molding. The ratio of the pores which are not covered with the fibers constituting the non-woven fabric, i.e., the pores without the fibers, is preferably in the range of 30% to 95% of the total area of the non-woven fabric. With a ratio of less than 30%, the resin impregnation rate is lowered, and thus the use of a resin curable at normal temperature undesirably starts curing of the resin in a state wherein the resin is not diffused over the entire region. With a ratio of over 95%, the amount of the fibers in the non-woven fabric is decreased to deteriorate the effect of improving interlayer toughness of FRP, which is an object of the present invention. The ratio of the pores is more preferably in the range of 40% to 90%.

The preform of the present invention is formed by laminating a plurality the complex fiber reinforcing material layers of the present invention so that the material and the non-woven fabric are alternately laminated.

Although the method of integrating the complex fiber reinforcing materials is not limited, the material and the non-woven fabric, and a plurality of the laminated complex fiber reinforcing material layers are preferably bonded in a form shaped by the mold by heating and pressurizing a small amount of the low-melting-point thermoplastic polymer contained in the fibers constituting the non-woven fabric.

Also, the complex fiber reinforcing materials are preferably integrated with each other by using the pressure sensitive adhesive. As the pressure sensitive adhesive, reactive bismaleimide, epoxy, and PMMA type adhesives used for forming the complex fiber reinforcing material are preferably used. The amount of the adhesive adhered is preferably about 1 to 10 g/m$^2$, and 2 to 20 g/m$^2$ including the adhesive adhered to the complex fiber reinforcing materials and the preform.

In the preform, the fiber orientation of the material is not limited, and the fiber orientation directions of the laminated-layers may be the same, or the fiber orientation directions may be 0, 90° and ±45° so that the mechanical properties of FRP are quasi-isotropic.

The preform of the present invention comprises the complex fiber reinforcing material having the excellent fitting property for the mold, and thus is closely filled in the mold without forming a gap between the preform and the mold, thereby preventing the formation of an over-resin layer on the surface of FRP and wrinkling in shaping by the mold. Therefore, a FRP molded product having a smooth surface and comprising uniformly dispersed fibers can be obtained.

Also, the interleaf layers comprising fibers are formed between the layers of the materials to improve the interlayer toughness of FRP.

Although FRP can be molded by a conventional known method using the complex fiber reinforcing material of the present invention, particularly the resin transfer molding method, the vacuum bag molding method are capable of producing a large molding at low cost, and are thus preferably used.

Description will now be made of an example of the method of producing a fiber reinforced plastic of the present invention by vacuum bag molding using the preform of the present invention.

Figure 8:
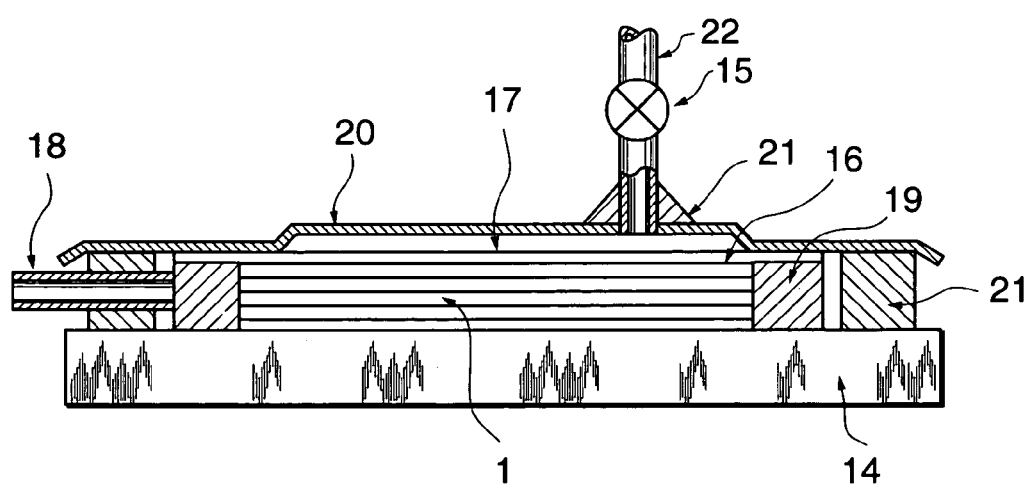
FIG. 8 is a drawing showing an example of a FRP molding method of the present invention.

FIG. 8 is a sectional view of an example illustrating the method of molding FRP of the present invention. In FIG. 8, a predetermined number of complex fiber reinforcing material layers 1 are laminated on a mold 14 in a predetermined direction, and a sheet which is peeled after curing a resin, i.e., a peel ply 16, is laminated thereon, and a medium is placed on the peel ply 16, for diffusing the resin over the entire surface of the complex fiber reinforcing material. Also, an edge breezer 19 comprising a laminate of a plurality of porous material layers of woven fabric or the like, and an air suction port 18 of a vacuum pump is provided around the preform, the whole structure is covered with a bag film 20, and the periphery of the bag film 20 is bonded with a sealing material 21 to prevent air leakage. Furthermore, a resin discharge port 22 is mounted on the top of the back film, for injecting the resin from a resin tank, and the mounting portion is bonded with the sealing material 21 to prevent air leakage. The resin tank contains a room temperature curing thermoplastic resin which contains a predetermined amount of curing agent, and which is syrupy at normal temperature. The preform covered with the bag film is brought into a vacuum state at vacuum pressure of about 93310 to 101325 Pa by the vacuum pump, and then a valve 15 is opened to inject the resin. Since the inside of the bag film is in a vacuum state, and the resin flow resistance in the thickness direction of the preform is higher than that in the planar direction of the medium, the resin first spreads over the entire surface of the medium, and then impregnation in the thickness direction of the preform proceeds. In this method, the distance of a necessary resin flow corresponds to the length of the preform, and thus resin impregnation is rapidly completed. The vacuum pump is preferably operated to maintain the inside of the bag film in a vacuum state at least until the resin impregnation is completed. After resin impregnation is completed, the valve is closed, and the resin is cured by allowing the resin to stand at room temperature. After the resin is cured, the peel ply is peeled to remove the medium and the bag film, and the reform is removed from the mold to obtain a FRP molded product.

Figure 9:
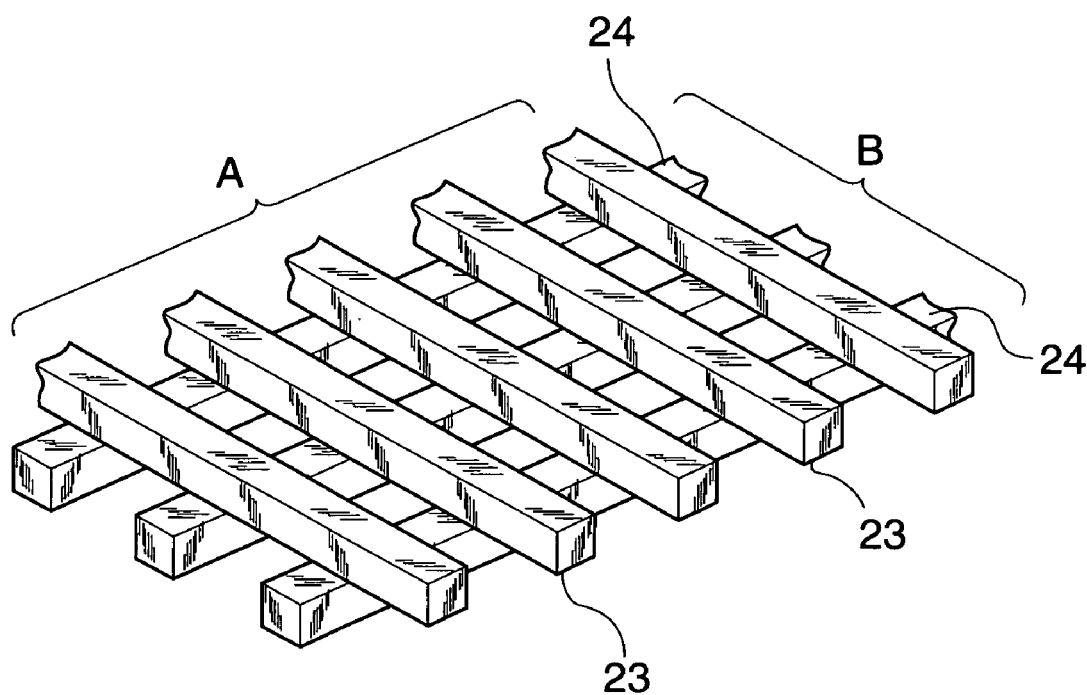
FIG. 9 is a drawing showing an example of a resin diffusing medium used in the molding method of the present invention.

FIG. 9 shows an example of the medium 17 used in the present invention. The medium is used for transmitting the vacuum pressure in the bag film to the preform, and diffuses the injected resin over the entire region of the medium side surface of the preform by passing the resin through the spaces of the medium. Namely, when the resin is injected into the medium located between the bag film and the peel ply, in FIG. 9, the injected resin flows through the spaces between the bars 23 of group A adjacent to the bag film in the direction of the bars 23, and at the same time, the resin flows through the spaces between the bars 24 in group B having a rectangular sectional shape in the direction of the bars 24 to diffuse the resin in all directions. Since the force acting on the bar 23 can be transmitted to the bars 24, the vacuum pressure can be transmitted to the preform. Examples of the medium include mesh sheets made of polypropylene, polyethylene, polyester, polyvinyl chloride, metals, and the like. For example, a resin mesh film, a woven fabric, a net, a knit fabric, and the like can be used, and a lamination of some of these materials can be used according to demand.

Although the case in which the medium is provided on the upper side of the preform has been described above, when the preform is thick, the medium may be provided on either of the upper and lower sides of the preform so that the preform is impregnated with the resin from both sides.

The above-described molding method roughly belongs to the category of the vacuum bag molding method, but is different from a conventional vacuum bag molding method in that the resin is diffused over the entire surface of the preform at the same time of injection of the resin. Particularly, the method is suitable for use in molding a large FRP molded product.

The peel ply used in molding of the present invention is a sheet which is peeled from FRP after the resin is cured, and the resin must be passed through the peel ply. A nylon fiber woven fabric, a polyester fiber woven fabric, a glass fiber woven fabric, and the like can be used, and a nylon fiber woven fabric and a polyester fiber woven fabric are preferably used because they are inexpensive. The fabrics are preferably refined for preventing contamination of the FRP resin with an oil solution and sizing agent used in producing these fabrics, and hot-set fabrics are preferably used for preventing shrinkage of the room temperature curing resin due to the heat produced in curing.

In the edge breezer used for molding of the present invention, air and the resin must be passed therethrough, and a nylon fiber woven fabric, a polyester fiber woven fabric, a glass fiber woven fabric, and a mat composed of nylon fibers or polyester fibers can be used.

The bag film used in molding of the present invention must be airtight, and a nylon film, a polyester film, a PVC film, and the like can be used.

As another method of molding a fiber reinforced plastic using the preform of the present invention, the preform of the present invention is set in a cavity formed by a he-mold and a she-mold, and the resin is injected into the cavity under vacuum to impregnate the fiber material with the resin, and then cured.

Although this molding method has a disadvantage that the two molds including the he-mold and the she-mold are required as compared with the conventional vacuum bag molding method, a molded product having good dimensional precision can be obtained because the thickness of FRP is determined by the space between the he-mold and the she-mold, and this molding method is desirable as a method of molding an aircraft structural material required to have high reliability.

The resin used in the present invention is a room temperature curing thermosetting resin liquid at room temperature, such as an epoxy resin, unsaturated polyester resin, vinylester resin, phenolic resin, or the like. The viscosity of the resin used is preferably low from the viewpoint of the resin impregnation property and impregnation rate, and preferably in the range of about 0.5 to 10 poise, more preferably in the range of 0.5 to 5 poise. Particularly, a vinyl ester resin is preferably used because the viscosity of the resin can be decreased, and the resin elongation can be increased by 3.5 to 12%, thereby exhibiting not only excellent moldability but also high strength and excellent impact resistance.

EXAMPLE 1

As a fiber reinforcing material, a bi-directional woven fabric was used, in which flat carbon fiber yarns used as warp yarns and weft yarns had a size of 8000 decitex, a tensile strength of 4800 MPa, an elasticity modulus of 230 GPa, a breaking elongation of 2.1%, and a number of filaments of 12,000, and the density of the warp yarns and the weft yarns was 1.25 yarns/cm, and weight per unit area of the fabric was 200 g/m$^2$.

The cover factor of the woven fabric was as high as 99.7%.

The cover factor was determined as follows.

First, a stereoscopic microscope, for example, stereoscopic microscope SMZ-10-1 produced by Nikon Co., Ltd. was used for photographing the surface of the woven fabric while applying light to the back side of the fiber reinforcing material. As a result, a transmitted light pattern of the woven fabric was photographed, in which the weaving yarn portions were black, and the texture portions were white. The quantity of light was adjusted in a range causing no halation. Also, the density of the projected image was uniformly controlled by reflecting light of Double arm fiber optic light course produced by Nikon Co., Ltd. from an acrylic plate. The magnification of photography was set to 10 or less so that 2 to 20 yarns each of the warp yarns and the weft yarns were observed in an analysis range in subsequent image analysis. Next, the obtained photograph was photographed by a CCD (charge coupled device) camera to be converted to digital data indicating the brightness of white and black, which was stored in memory. The data was analyzed by an image processing apparatus to calculate the cover factor Cf from the total area S1 and the sum S2 of the white areas according to the following equation:

$$Cf=[(S1-S2)/S1]\times 100$$

This operation was carried for 10 positions of the same fabric, and the simple average was referred to as the cover factor. As the CCD camera and the image processing apparatus, Personal image analysis system LA-526 produced by Pias Co., Ltd. was used. The range of image analysis was set to range from the left end of the leftmost warp yarn of the photograph to the left end of the rightmost warp yarn in the transverse direction, and range from the upper end of the uppermost weft yarn of the photograph to the upper end of the lowermost weft yarn in the longitudinal direction so that 2 to 20 yarns each of the warp yarns and the weft yarns were observed in this range. The digital data included gray portions in the boundaries between the weaving yarn portions (black portions) and the texture portions (white portions). As a model for differentiating the gray portions between the weaving yarn portions and the texture portions, a black tape having a width of 6 mm was attached at intervals of 6 mm in a lattice form to a transparent sheet, and normalized so that the cover factor was 75%. Namely, with diaphragm of the CCD camera set to 2.8, normalization was performed assuming that a portion showing a memory value of 128 or less by the image analysis system LA-515 was the weaving yarn portion (in this system, while-black depth was stored as memory values in 0 to 255 steps).

Since the carbon fiber yarns as the weaving yarns cross with a low density, the woven fabric had low shape stability, but had the ease of shear deformation and the excellent fitting property.

Also, a non-woven fabric having weight per unit area of 8 g/m$^2$ was used, which was formed by mixing high-melting-point nylon short fibers having a melting point of 260° C. and low-melting-point nylon short fibers having a melting point of 140° C. at a ratio of 60:40, forming webs by a carding apparatus, and laminating the webs, and then 10 times stretched the product.

The non-woven fabric had a void ratio of 90% and high stretchability.

The void ratio was calculated by the following equation:

$$\text{Void ratio } (\%) = [1-(\text{true volume of non-woven fabric}/\text{apparent volume})] \times 100$$

The true volume of the non-woven fabric means (weight of the non-woven fabric per unit area)/(specific gravity of fibers), and the apparent volume means (thickness of the non-woven fabric)×(unit area). The weight of the non-woven fabric per unit area was measured by using cut pieces of 1 m×1 m of the non-woven fabric and a chemical balance produced by Kensei Kogyou Co., Ltd., and the specific gravity of fibers was calculated by using the specific gravity of nylon. The thickness of the non-woven fabric was measured by using a digital constant-pressure thickness meter produced by Toyo Seiki Seisakusho Co., Ltd. under a pressure of 23.5 kPa according to JIS L 1098.

The fiber reinforcing material and the non-woven fabric were combined together, and supplied to a needle punching apparatus for needle-punching at a punching density of 6 punches/cm$^2$ to integrate the non-woven fabric with the fiber reinforcing material by passing the short fibers constituting the non-woven fabric through the fiber reinforcing material.

In the integrated material, the short fibers of the non-woven fabric were passed through the fiber reinforcing material, and thus the weaving yarns were not loosen even by cutting, exhibiting the good handleability. In addition, the non-woven fabric also had stretchability, and thus the fabric could be easily fitted to a mold having a curved surface without-inhibiting the fitting property of the woven fabric.

Next, in order to evaluate the composite properties of the integrated material, a cured plate was formed by vacuum bag molding.

An epoxy resin PR500 produced by 3M Co., Ltd. was injected under heating to 110° C., and cured at 177° C. for 4 hours.

In the lamination method, the fiber reinforcing material layers and the non-woven fabric layers were alternately laminated and bonded by melting the low-melting-point nylon contained in the non-woven fabric by ironing at each time of lamination.

As a result, the integrated material could be set on the molding plate without causing deviation and wrinkles.

The cured plate for evaluating the fiber volume content (Vf) was cut into a size of 350 mm×350 mm, and six sheets were laminated in the same direction and molded. Vf represents the volume content of the reinforcing fibers excluding the non-woven fabric, and was calculated by the following equation.

$$Vf(\%) = [(\text{weight per unit area of reinforcing fibers} \times \text{number of sheets laminated})/\text{density of reinforcing fibers}]/\text{thickness of molded product}$$

The weight per unit area of the reinforcing fibers was determined by measuring the weight of the fiber reinforcing material used before molding by a chemical balance produced by Kensei Kogyo Co., Ltd., followed by calculation. The thickness of the molded product was determined by measuring thickness at a total of nine positions of the edges and the central portion of the cured sheet after molding by a thickness gauge and simply averaging the measurements.

In a tensile test, the integrated material was cut into a size of 25.0 mm wide (in a uni-directional material, 12.5 mm)×250 mm long, and glass tabs were bonded to both ends thereof to form a tensile test piece which was then subjected to the tensile test to measure a breaking load and determine tensile strength according to JIS K7073.

For evaluation of CAI (compression strength after falling weight impact) as an impact property, the integrated material was cut into a size of 350 mm×350 mm, and 12 cut pieces were laminated in a structure in which (±45°)/(0°, 90°) was repeated six times assuming that the warp yarn direction of the fabric was 0°, and the weft yarn direction was 90°, and then 12 pieces were laminated in a structure in which (0°, 90°)/(±45°) was repeated symmetrically with the under lamination. The resultant laminate was set on the mold plate to obtain a quasi-isotropic plate of $[(\pm 45°)/(0°, 90°)]_{6S}$.

Then, a test piece of 101.6 mm×152.4 mm was cut out of the thus-obtained plate, and the compression strength after impact (CAI) was measured according to Boeing test method BMS7260. This test was carried out with falling impact energy of 67 J/cm.

The test results are summarized in Table 1. It was found that the complex material using the integrated material of this invention exhibits high tensile strength and high CAI, and thus the complex fiber reinforcing material of the present invention is excellent as a complex material.

COMPARATIVE EXAMPLE 1

A material was formed by the same method as Example 1 except that the non-woven fabric was not integrated, and only carbon fibers were used. The test results are summarized in Table 1.

The material without the non-woven fabric had high CAI as compared with the complex material integrated with the non-woven fabric, and had the problem of loosening the weaving yarns during molding.

COMPARATIVE EXAMPLE 2

A complex material was formed by the same method as Example 1 except that a spun bond type non-woven fabric having weight per unit area of 8 g/m$^2$ and comprising 100% high-melting-point nylon having a melting point of 260° C.

was used as the non-woven fabric, and needle punching was not carried out. The evaluation results are shown in Table 1.

Since the non-woven fabric was not integrated with the fiber reinforcing material, the weaving yarns were loosened during lamination, and deviation occurred in lamination, causing difficulties in handing.

With respect to the composite properties, the CAI property was substantially the same level as Example 1, while the tensile strength was slightly low due to disturbance in the material during lamination.

COMPARATIVE EXAMPLE 3

A cured plate was formed by the same method as Example 1 except that a spun bond type non-woven fabric having weight per unit area of 48 g/m$^2$ and comprising 100% high-melting-point nylon having a melting point of 260° C. was used as the non-woven fabric, and integrated with the same fiber reinforcing material as Example 1 by needle punching to form an integrated material. The evaluation results are summarized in Table 1.

Since the non-woven fabric of the integrated material had low elongation, the integrated material could not be fitted to a curved surface in the integrated state, thereby causing a problem in which if the material was forced to be fitted to the curved surface, the non-woven fabric was peeled and wrinkled.

With respect to the properties of the cured plate, CAI was high, while Vf was low due to the large thickness of the non-woven fabric, exhibiting low tensile strength. Also, the coefficient of water absorption was high, and the material was possibly unsuitable as an aircraft member required to have reliability.

EXAMPLE 2

The same fiber reinforcing material and non-woven fabric as those used in Example 1 were integrated by needle punching, and pressure-bonded under heating to a temperature higher than the melting point of the low-melting-point nylon contained in the non-woven fabric by a hot roller to form an integrated material, followed by evaluation by the same method as Example 1. The results are summarized in Table 1.

Since the fiber reinforcing material and the non-woven fabric were integrated by needle punching and heat bonding, the handleability was excellent.

The fitting property was lower than Example 1, but was sufficient because the non-woven fabric contained a small amount of low-melting-point fibers.

The composite properties were also substantially the same level as Example 1, and the material of this example was excellent as a complex material.

EXAMPLE 3

The same fiber reinforcing material as that used in Example 1, and a spun bond type non-woven fabric having weight per unit area of 8 g/m$^2$, and comprising 100% high-melting-point nylon having a melting point of 260° C. were used, and bonded by coating, to one side of the fiber reinforcing material, 2 g/m$^2$ of a pressure sensitive adhesive composed of epoxy resin containing no curing agent and having a viscosity of 1.2 poise to form an integrated material. Evaluation was carried out by the same method as Example 1, and the results are summarized in Table 1.

Since the fiber reinforcing material and the non-woven fabric were integrated by bonding with a small amount of pressure sensitive adhesive, the shape was stable. In addition, deviation easily occurred between the fiber reinforcing material and the non-woven fabric, and the non-woven fabric had stretchability, thereby obtaining a material which could be easily fitted to a mold.

With respect to the composite properties, the tensile strength was high without being influenced by a small amount of pressure sensitive adhesive, and the CAI value was also high due to the presence of the non-woven fabric between the fiber reinforcing material layers, exhibiting excellent properties as a complex material.

COMPARATIVE EXAMPLE 4

A melt blow long fiber non-woven fabric comprising nylon having a melting point of about 140° C. and having weight per unit area of 10 g/m$^2$ was used as the non-woven fabric, and pressured-bonded with the same fiber reinforcing material as that used in Example 1 by heating using a hot roller to form an integrated material. The composite properties were evaluated by the same method as Example 1, and the results are summarized in Table 1.

In the integrated material, the non-woven fabric comprising 100% low-melting-point nylon was strongly bonded with the fiber reinforcing material, and thus the shape stability was excellent, but the fitting property deteriorated due to excessively strong bonding.

With respect to the composite properties, the tensile strength was substantially the same level as Example 1, while the non-woven fabric for increasing the interlayer strength was melted in the resin during molding because the non-woven fabric comprised low-melting-point fibers, thereby causing no interlayer reinforcing effect, a low CAI value, and substantially no effect.

EXAMPLE 4

As the fiber reinforcing material, a uni-directional woven fabric was used, in which flat carbon fiber yarns having a size of 8000 decitex, a tensile strength of 4800 Mpa. an elasticity modulus of 230 GPa, a breaking elongation of 2.1%, a number of filaments of 12,000, and a yarn width of 6.5 mm were used as warp yarns, and glass fiber yarns having a size of 225 decitex were used as weft yarns, the density of the warp yarns was 3.75 yarns/cm, the density of the weft yarns was 3.0 yarns/cm, the weight per unit area of the carbon fiber yarns was 300 g/m$^2$, and the cover factor was 99.7%.

The woven fabric was a woven fabric having a woven structure in which the thick warp yarns were integrated with the thin weft yarns, and the carbon fiber yarns as the warp yarns are less crimped, and thus the weaving yarns were easily deviated, thereby making unstable the fabric.

The same non-woven fabric as that used in Example 1 was used, and integrated by the same needle punching method as Example 1.

The fiber reinforcing material had shape instability, while the shape was stabilized by integration with the non-woven fabric by needle punching, thereby significantly improving the handleability.

In order to evaluate the composite properties of the integrated material of this example, molding was carried out by the same method as Example 1 except the lamination structure.

A cured plate for evaluating the fiber volume content (Vf) was formed by the same method as Example 1 comprising cutting the integrated material into a size of 350 mm×350 mm, and laminating four cut pieces in the same direction, and molding the laminate.

Also, for evaluation of CAI as an impact property, the integrated material was cut into a size of 350 mm×350 mm, and 8 cut pieces were laminated in a structure in which (−45°/0°/+45°/90°) was repeated two times assuming that the length direction of the fibers was 0°, and then 8 pieces were laminated in a structure in which (90°/+45°/0°/−45°) was repeated symmetrically with the under lamination. The resultant laminate was set on the mold plate to obtain a quasi-isotropic plate of $(-45°/0°/+45°90°)_{2S}$.

The same tests as Example 1 were carried out, and the results are summarized in Table 2.

The composite using the integrated material of this example exhibited high tensile strength and a high CAI value, and was thus an excellent material.

COMPARATIVE EXAMPLE 5

For comparison with Example 4, an integrated material was formed by the same method as Example 4 except that the non-woven fabric was not integrated, and only carbon fibers were used, and then evaluated. The results are summarized in Table 2.

Since the fiber reinforcing material was unstable, there were problems in which the carbon fiber yarns were loosened by cutting the material in the direction of the carbon fibers, and in which the fiber orientation was disturbed during lamination because of the low handleability, thereby requiring much time for lamination.

The composite had slightly low tensile strength due to disturbance of the fiber orientation of the carbon fibers, and CAI was also low due to the absence of the non-woven fabric.

COMPARATIVE EXAMPLE 6

The same spun bond type non-woven fabric as that used in Example 3, which comprised 100% high-melting-point nylon having a melting point of 260° C. and had weight per unit area of 8 g/m$^2$ was used as the non-woven fabric, and simply combined with the fiber reinforcing material without integration to form a composite, and then evaluated. The results are shown in Table 2.

Since the fiber reinforcing material was not integrated with the non-woven fabric, the carbon fibers were easily loosened during cutting, and the fiber orientation was disturbed, thereby causing poor handleability. Therefore, much time was required for lamination work.

The composite had a high CAI value due to the presence of the non-woven fabric between the fiber reinforcing mate rial layers, but had low tensile strength due to disturbance of the fiber orientation of the carbon fibers.

EXAMPLE 5

Evaluation was performed by the same method as Example 5 except that heating and pressure bonding were performed after integration by needle punching in the same manner was Example 4. The results are summarized in Table 2.

The unstable woven fabric was bonded by heating the low-melting-point fibers of the non-woven fabric, and thus the material had excellent shape stability and handleability as compared with the material of Example 4 integrated only by needle punching.

The tensile strength and CAI of the composite were substantially the same as Example 4, and thus the material of this example was an excellent material.

EXAMPLE 6

The same pressure sensitive adhesive as that used in Example 3 was coated at 3 g/m$^2$ on the same fiber reinforcing material as that used in Example 4, and the fiber reinforcing material was integrated with a spun bond type non-woven fabric comprising 100% high-melting-point nylon having a melting point of 260° C. and having weight per unit area 8 g/m2 by bonding. Then, a cured plate was formed and evaluated by the same method as Example 4. The results are summarized in Table 2.

Since the fiber reinforcing material was bonded with the non-woven fabric by the pressure sensitive adhesive, the material had excellent shape stability and the ease of handling.

The tensile strength and CAI of the composite were high, and thus an excellent material was obtained.

COMPARATIVE EXAMPLE 7

The same melt flow long-fiber non-woven fabric as that used in Comparative Example 3, which comprised nylon having a melting point of about 140° C. and had weight per unit area 10 g/m$^2$, was used as the non-woven fabric, and pressure-bonded with the same fiber reinforcing material as that used in Example 4 by heating using a hot roller to form an integrated material, and the composite properties were evaluated by the same method as Example 4. The results are summarized in Table 2.

In the integrated material, the fiber reinforcing material was strongly heat-bonded by the low-melting-point fibers of the non-woven fabric, and thus the material had excellent shape stability and the ease of handling. However, since the integrated material was excessively strongly bonded, the fitting property deteriorated.

Although the composite exhibited a high value of tensile strength because the predetermined fiber orientation was attained, the fibers constituting the non-woven fabric were melted in the resin during molding because of its low melting point to decrease the low CAI, failing to obtain the effect of the non-woven fabric.

TABLE 1

|  | Example | | | Comparative Example | | | |
| --- | --- | --- | --- | --- | --- | --- | --- |
|  | 1 | 2 | 3 | 1 | 2 | 3 | 4 |
| Non-woven fabric | | | | | | | |
| Weight per unit area (g/m²) | 8 | ← | ← | No | 8 | 48 | 10 |
| Type of fiber | Blend | ← | High melting point | No | High melting point | High melting point | Low melting point |
| (%) | 60/40 | ← | 100 | No | 100 | 100 | 100 |
| Raw material | Nylon | ← | ← | No | Nylon | Nylon | ← |
| Material | | | | | | | |
| Structure | Plane weave | ← | ← | Plane weave | ← | ← | ← |
| Size (dTex) | | | | | | | |
| Warp | 8000 | 8000 | ← | 8000 | ← | ← | ← |
| Weft | 8000 | 8000 | ← | 8000 | ← | ← | ← |
| Weight per unit area of woven fabric (g/m²) | 200 | 200 | ← | 200 | ← | ← | ← |
| Cover factor (%) | 99.7 | 99.7 | ← | 99.7 | ← | ← | ← |
| Yarn width (mm) | | | | | | | |
| Warp | 7.1 | 7.1 | ← | 7.1 | ← | ← | ← |
| Weft | 7.8 | 7.8 | ← | 7.8 | ← | ← | ← |
| Yarn thickness (mm) | | | | | | | |
| Warp | 0.13 | 0.13 | ← | 0.13 | ← | ← | ← |
| Weft | 0.11 | 0.11 | ← | 0.11 | ← | ← | ← |
| Integration | | | | | | | |
| Needle punching | ○ | ○ | No | No | No | ○ | No |
| Heat bonding | No | ○ | No | No | No | No | ○ |
| Adhesion | No | No | ○ | No | No | No | No |
| Property of cured plate | | | | | | | |
| Vf (%) | 58 | 58 | 59 | 60 | 58 | 45 | 61 |
| Tensile strength (MPa) | 1166 | 1160 | 1187 | 1060 | 1058 | 904 | 1200 |
| CAI (Pa) | 277.2 | 275.8 | 282.0 | 235.1 | 276.8 | 261.2 | 236.5 |
| Water absorption (%) | 1.5 | 1.4 | 1.3 | 1.3 | 1.4 | 1.8 | 1.4 |
| Fitting property of preform | ⊙ | ○ | ○ | ○ | ○ | x | Δ |

TABLE 2

|  | Example | | | Comparative Example | | | Example | | | Comparative Example | | |
| --- | --- | --- | --- | --- | --- | --- | --- | --- | --- | --- | --- | --- |
|  | 4 | 5 | 6 | 5 | 6 | 7 | 4 | 5 | 6 | 5 | 6 | 7 |
| Non-woven fabric | | | | | | | | | | | | |
| Weight per unit area (g/m²) | 8 | ← | ← | No | 8 | 50 | | | | | | |
| Type of fiber | Blend | ← | High melting point | No | High melting point | Low melting point | | | | | | |
| (%) | 60/40 | ← | 100 | No | 100 | 100 | | | | | | |
| Raw material | Nylon | ← | ← | No | Nylon | ← | | | | | | |
| Material | | | | | | | | | | | | |
| Structure | | | | | | | Plane weave | ← | ← | Plane weave | ← | Plane weave |
| Weight per unit area of woven fabric (g/m²) | | | | | | | 307 | ← | ← | 307 | ← | ← |
| Weigth per unit area of carbon fiber (g/m²) | | | | | | | 300 | ← | ← | 300 | ← | ← |

TABLE 2-continued

|  | Example | | | Comparative Example | | |
| --- | --- | --- | --- | --- | --- | --- |
|  | 4 | 5 | 6 | 5 | 6 | 7 |
| Size (dTex) | | | | | | |
| Warp | 8000 | ← | | 8000 | ← | 8000 |
| Weft | 225 | | | 225 | | 225 |
| Cover factor (%) | 99.7 | | | 99.9 | ← | ← |
| Interval of warp yarns (mm) | 0.2 | | | 0.2 | ← | ← |
| Integration | | | | | | |
| Needle punching | ○ | ○ | No | No | No | No |
| Heat bonding | No | ○ | No | No | No | ○ |
| Adhesion | No | No | ○ | No | No | No |
| Property of cured plate | | | | | | |
| Vf (%) | 59 | 58 | 59 | 61 | 60 | 44 |
| Tensile strength (MPa) | 2335 | 2320 | 2374 | 2131 | 1810 | 1461 |
| CAI (Pa) | 329.6 | 326.1 | 331.0 | 140.0 | 250.4 | 179.3 |
| Water absorption (%) | 1.4 | 1.5 | 1.4 | 1.3 | 1.5 | 1.9 |
| Fitting property of preform | ○ | ⊙ | ⊙ | x | x | ⊙ |

INDUSTRIAL APPLICABILITY

As described above, a complex fiber reinforcing material of the present invention has excellent fitting property for a mold, and permits the formation of a preform without wrinkles. A preform of the present invention has excellent handleability, and permits the production of FRP having excellent impact resistance because non-woven fabric layers composed of fibers are present between the layers of a material. The method of producing FRP of the present invention comprises molding FRP without prepreg processing, and thus can obtain an inexpensive molded product, and precisely provide interleaf layers between the layers of FRP, thereby obtaining a FRP molded product having excellent reliability.

What is claimed is:

1. A complex fiber reinforcing material comprising a sheet-formed carbon fiber reinforcing material comprising a woven fabric or a stitch cloth of carbon fibers, and a non woven fabric comprising short fibers including organic fibers, wherein the non-woven fabric is laminated onto at least one side of the carbon fiber reinforcing material, the short fibers pass through the fiber reinforcing material to integrate the carbon fiber reinforcing material with the non-woven fabric, the weight per unit area of the carbon fiber reinforcing material is 100 to 2000 g/m² and the weight per unit area of the non-woven fabric is 5 to 30 g/m².

2. A complex fiber reinforcing material comprising a sheet-formed carbon fiber reinforcing material comprising a woven fabric or a stitch cloth of carbon fibers, and a nonwoven fabric including organic fibers laminated on at least one side of the carbon fiber reinforcing material, wherein the non-woven fabric is integrated with the fiber reinforcing material by a pressure sensitive adhesive, the weight per unit area of the carbon fiber reinforcing material is 100 to 2000 g/m² and the weight per unit area of the non-woven fabric is 5 to 30 g/m².

3. A complex fiber reinforcing material comprising a sheet-formed carbon fiber reinforcing material comprising a woven fabric or a stitch cloth of carbon fibers, and a non woven fabric including organic fibers laminated on at least one side of the carbon fiber reinforcing material, wherein the non-woven fabric contains 5 to 50% by weight of low-melting point fibers, and the carbon fiber reinforcing material is integrated with the non-woven fabric by heat bonding, the weight per unit area of the carbon fiber reinforcing material is 100 to 2000 $\mu m^2$ and the weight per unit area of the non-woven fabric is 5 to 30 g/m².

4. A complex fiber reinforcing material according to any one of claims 1 to 3, wherein the size of the carbon fiber yarns of the carbon fiber reinforcing material is 550 to 270000 decitex, and the number of filaments per carbon fiber is 1000 to 400000.

5. A complex fiber reinforcing material according to any one of claims 1 to 3, wherein the carbon fiber reinforcing material comprises a woven fabric having a cover factor of 95% or more.

6. A complex fiber reinforcing material according to any one of claims 1 to 3, wherein the non-woven fabric contains low-melting-point fibers comprising a thermoplastic polymer having a low melting point.

7. A complex fiber reinforcing material according to any one of claims 1 to 3, wherein the non-woven fabric comprises conjugate fibers comprising a core having a sectional area of 30 to 70% of the sectional area of the conjugate fiber.

8. A complex fiber reinforcing material according to claim 7, wherein the cores of each of the conjugate fibers comprise nylon 6 or nylon 66, and the sheath comprises nylon copolymer.

9. A complex fiber reinforcing material according to any one of claims 1 to 3, wherein the carbon fiber reinforcing material comprises a uni-directional woven fabric comprising carbon fibers yarns oriented in a length direction of the material, and auxiliary yarns thinner than the carbon fiber yarns and oriented in a width direction of the material, to form a woven structure.

10. A complex fiber reinforcing material according to claim 9, wherein the carbon fiber yarns are oriented in the length direction at intervals of 0.1 to 5 mm in uni-directional woven fabric.

11. A complex fiber reinforcing material according to any one of claims 1 to 3, wherein the carbon fiber reinforcing material comprises a bi-directional woven fabric comprising carbon fiber yarns oriented in a length direction and a width direction of the material to form a woven structure.

12. A complex fiber reinforcing material according to claim 11, wherein the carbon fiber yarns of the bi-directional woven fabric, which are oriented in at least one of the length direction and the width direction, are flat carbon fiber yarns having a width in the range of 4 to 30 mm, and a thickness in the range of 0.1 to 1.0 mm.

13. A complex fiber reinforcing material according to any one of claims 1 to 3, wherein the fiber reinforcing material comprises a stitch cloth comprising at least two groups of reinforcing yarns which are crossed with each other and which are stitched with a stitch yarn.

14. A complex fiber reinforcing material according to any one of claims 1 to 3, wherein the carbon fibers have a tensile modulus of 200 Gpa or more, and a tensile strength of 4.5 Gpa or more.

15. A complex fiber reinforcing material according to any one of claims 1 to 3, wherein the non-woven fabric has a void ratio of 30 to 95% of the total area of the non-woven fabric.

16. A complex fiber reinforcing material according to claim 2, wherein the amount of pressure sensitive adhesive used is 1 to 10 g/m$^2$.

17. A preform comprising a laminate of a plurality of layers of the complex fiber reinforcing material according to any one of claims 1 to 3, wherein the plurality of the complex fiber reinforcing material are laminated such that the carbon fiber reinforcing material and the nonwoven fabric are located alternately.

18. A preform according to claim 17, wherein the fiber reinforcing material layers are integrated with each other by heat bonding low-melting-point fibers contained in the non-woven fabric.

19. A preform according to claim 17, wherein the fiber reinforcing material layers are integrated with each other by a pressure sensitive adhesive.

20. A method of producing a fiber reinforced plastic comprising covering a preform according to any one of claims 1 to 3 with a bag film, injecting a resin into the bag film in a vacuum state to impregnate the complex fiber reinforcing material with the resin, and curing the resin.

21. A method of producing a fiber reinforced plastic comprising setting a preform according to any one of claims 1 to 3 in a cavity formed by a male mold and a female mold, injecting a resin into the cavity in a vacuum state to impregnate the complex fiber reinforcing material with the resin, and curing the resin.

* * * * *